(12) United States Patent
Bae et al.

(10) Patent No.: US 12,552,074 B2
(45) Date of Patent: Feb. 17, 2026

(54) FOAM-MOLDING MOLD HAVING CHANNELS FORMED THEREIN AND PHYSICAL FOAMING PROCESS USING SAME

(71) Applicant: HANWHA SOLUTIONS CORPORATION, Seoul (KR)

(72) Inventors: Seong Soo Bae, Daejeon (KR); Chul Ee Kang, Daejeon (KR); Jae Hyeok Lee, Daejeon (KR); Won Jun Kang, Daejeon (KR); Han Soo Song, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 233 days.

(21) Appl. No.: 18/039,430

(22) PCT Filed: Nov. 22, 2021

(86) PCT No.: PCT/KR2021/017126
§ 371 (c)(1),
(2) Date: Jun. 26, 2023

(87) PCT Pub. No.: WO2022/114690
PCT Pub. Date: Jun. 2, 2022

(65) Prior Publication Data
US 2024/0001598 A1    Jan. 4, 2024

(30) Foreign Application Priority Data
Nov. 30, 2020    (KR) .......................... 10-2020-0164358

(51) Int. Cl.
*B29C 44/58*    (2006.01)
*B29C 44/02*    (2006.01)
*B29K 105/04*    (2006.01)
*B29L 31/50*    (2006.01)

(52) U.S. Cl.
CPC ............ *B29C 44/58* (2013.01); *B29C 44/027* (2013.01); *B29K 2105/04* (2013.01); *B29L 2031/504* (2013.01); *B29L 2031/507* (2013.01)

(58) Field of Classification Search
CPC ...... B29C 45/7337; B29C 2045/14213; B29C 33/04; B29C 44/027; B29C 44/58
See application file for complete search history.

(56) References Cited

U.S. PATENT DOCUMENTS

2019/0389100 A1    12/2019  Lin et al.

FOREIGN PATENT DOCUMENTS

| CN | 202208107 | * | 5/2012 |
| CN | 107891569 A | | 4/2018 |
| CN | 110625891 A | | 12/2019 |

(Continued)

OTHER PUBLICATIONS

International Search Report for PCT/KR2021/017126, dated Mar. 4, 2022.

*Primary Examiner* — Stella K Yi
(74) *Attorney, Agent, or Firm* — Sughrue Mion, PLLC

(57) ABSTRACT

This disclosure relates to a foam-molding mold having channels formed therein and a physical foaming process using the same, and more specifically, the foam-molding mold is characterized by comprising a cavity formed therein for accommodating mixed resin for foaming, and having channels formed therein for guiding gas to the cavity.

7 Claims, 7 Drawing Sheets

(56) References Cited

FOREIGN PATENT DOCUMENTS

| | | | |
|---|---|---|---|
| JP | 2005-220303 | A | 8/2005 |
| KR | 10-2005-0122547 | A | 12/2005 |
| KR | 10-1622710 | B1 | 5/2016 |
| KR | 10-2017-0058711 | A | 5/2017 |
| KR | 10-1771653 | B1 | 8/2017 |
| KR | 10-2018-0034074 | A | 4/2018 |
| WO | 2021/1118060 | A1 | 6/2021 |

\* cited by examiner

[FIG 1]
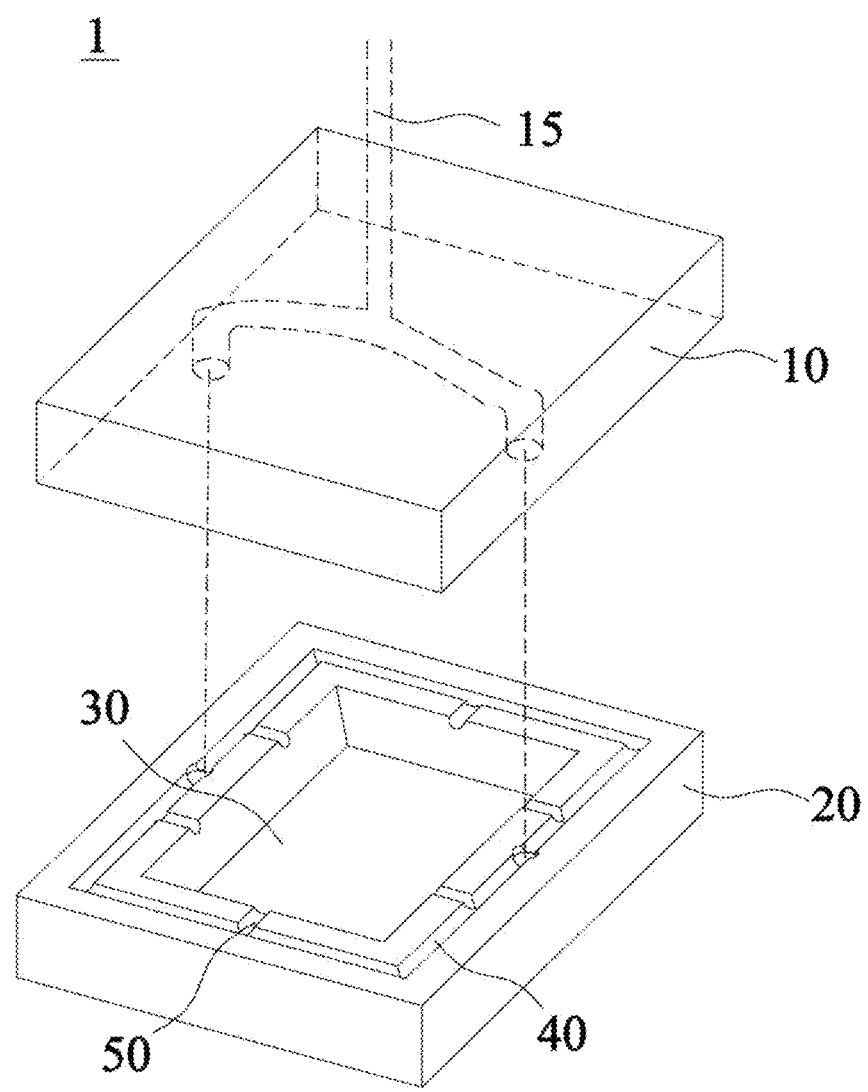

[FIG 2]
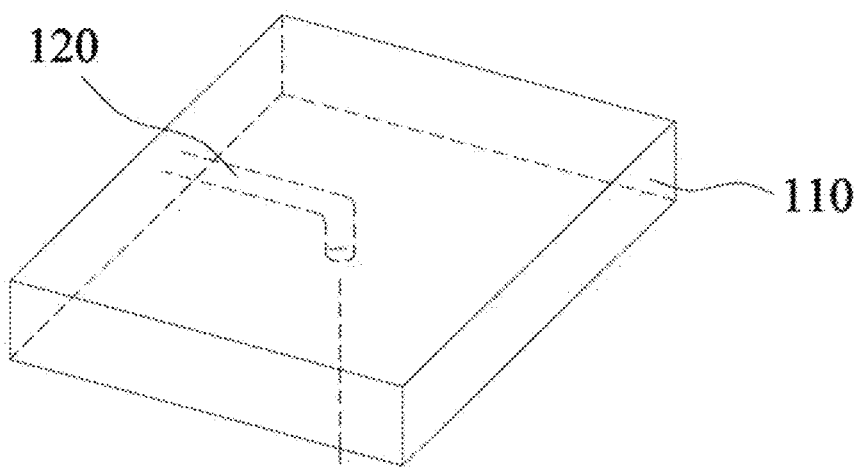

[FIG 3]
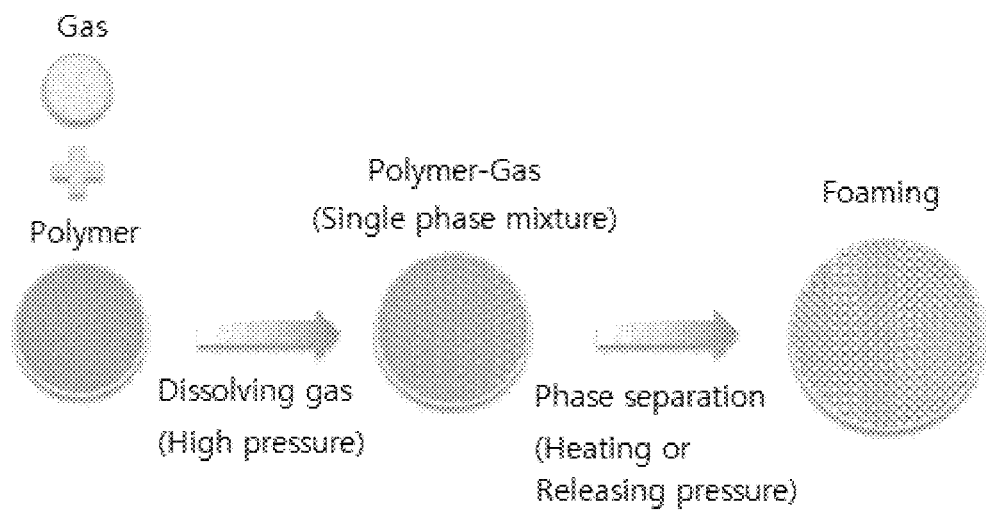
[FIG 4]
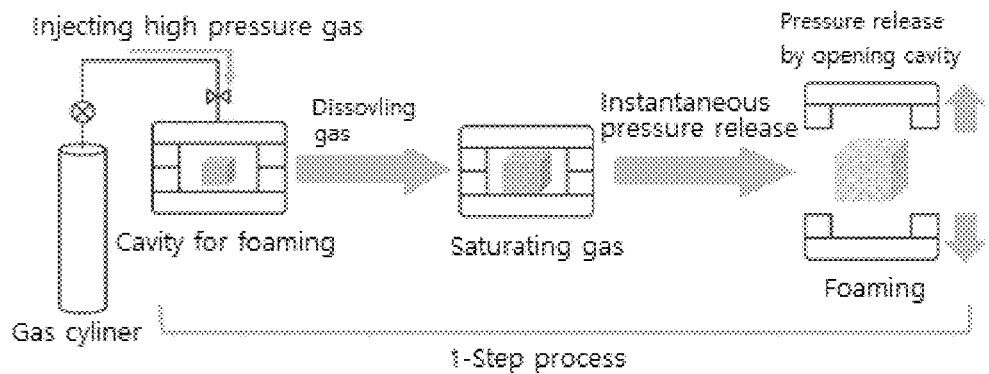

[FIG 5a]
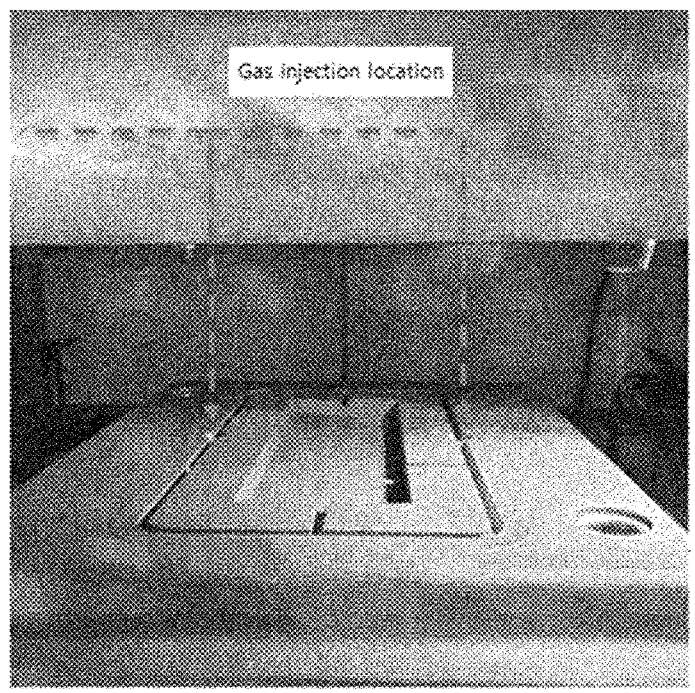

[FIG 5b]
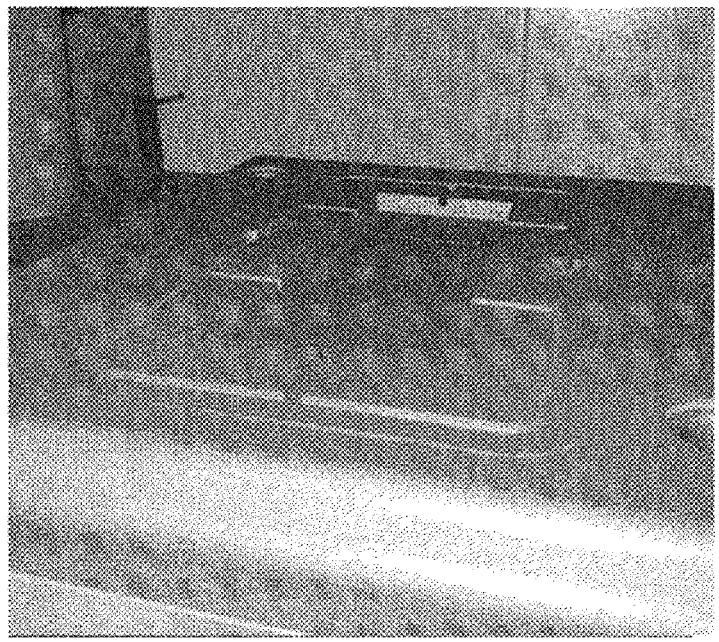

[FIG 6]
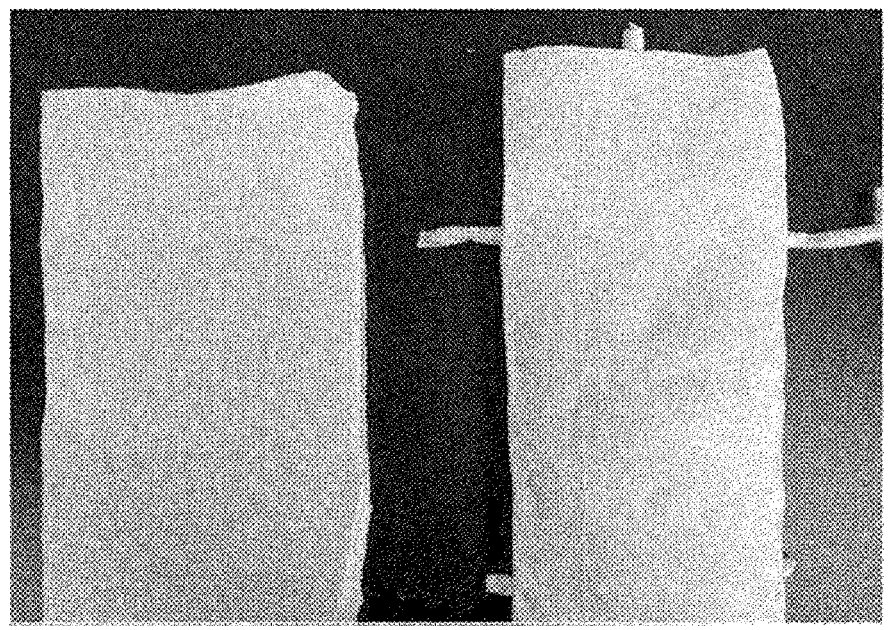

[FIG 7]
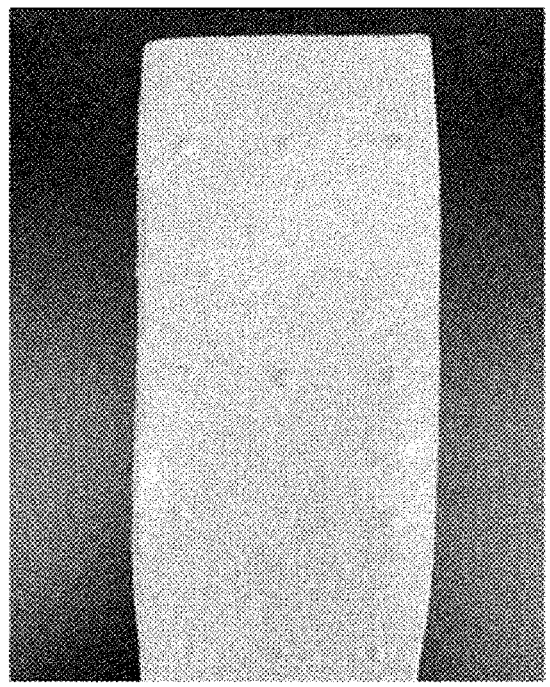

FOAM-MOLDING MOLD HAVING CHANNELS FORMED THEREIN AND PHYSICAL FOAMING PROCESS USING SAME

CROSS REFERENCE TO RELATED APPLICATIONS

This application is a National Stage of International Application No. PCT/KR2021/017126 filed Nov. 22, 2021, claiming priority based on Korean Patent Application No. 10-2020-0164358 filed Nov. 30, 2020.

TECHNICAL FIELD

This disclosure relates to a foam-molding mold having channels formed therein and a physical foaming process using the same, and more specifically, the foam-molding mold is characterized by comprising a cavity formed therein for accommodating mixed resin for foaming, and having channels formed therein for guiding gas to the cavity.

BACKGROUND ART

A polymer foaming process can be largely classified into a chemical foaming process and a physical foaming process. The chemical foaming process is used in various fields including preparation of elastomer foam such as cushion material of insole or midsole in the shoe industry, and is the most widely used process due to simplicity of the process and high productivity. The chemical foaming process is conducted in order of kneading of a chemical blowing agent, molding, heating, and foaming. However, during the chemical foaming process, a chemical blowing agent (JTR—azodicarbon amide) is heated and decomposed, and during the process of generating gas, harmful substances such as formamide or ammonia, and the like are generated to cause environmental problems, and thus, there are regulations relating to environment-friendliness.

In order to improve the problem, a physical foaming process in which gas is directly injected and dissolved in resin and then foaming is conducted, is being recently developed in the concerned technical field, and a physically foamed product prepared by such a physical foaming process is being applied for high price running shoes, and the like.

The physical foaming process is largely divided into 4 steps, consisting of steps of (a) charging gas in a high pressure chamber, (b) dissolving and saturating gas in polymer to prepare a single-phase mixture, (c) inducing thermodynamic instability to the mixture by heating or releasing pressure, thus generating foams in the polymer, and (d) foaming.

Wherein, a method of inducing thermodynamic instability is largely classified into two methods of (1) phase separation through heating of the mixture, and (2) phase separation through instantaneous pressure release.

Among them, (1) a foaming process through heating is a 2-step heating and foaming process and is currently most frequently used. It is a process wherein gas is saturated in an ultrahigh pressure autoclave of low temperature, and after about 48 hours, it is taken out, and heated in an oil-bath to slowly foam, and it requires more time and high price facilities such as an autoclave, and thus, the unit cost of production is very high. Further, the current physical foaming process enables foaming only in the form of a sheet and bead, thus requiring molding through post-processing treatment. Thus, in order to overcome such disadvantages, (2) a 1-step process using phase separation through instantaneous pressure release is required.

Thus, the inventors of the present disclosure, during studies for solving the above problems, developed a physical foaming process capable of simplifying the process and reducing time, and preparing a foamed body fulfilling required properties, and has applied for a patent (Patent Application No. 10-2019-0164422). However, in case the applied invention is adopted, since a gas inlet for injecting gas is formed so as to directly correspond to a cavity accommodating mixed resin for foaming, blocking of the gas inlet is caused due to back flow of the mixed resin for foaming, and thus, gas injection is not smoothly progressed.

Thus, the inventors, during studies for solving the problems again, found out that in case a channel for guiding gas to a cavity accommodating mixed resin for foaming is formed in a foam-molding mold, blocking of the gas inlet may be prevented, gas injection may become smooth, and simultaneously, washing of the mold may become easy, and thus, a processing time can be reduced, and completed the invention.

In this connection, Korean Registered Patent No. 10-0554781 discloses a method for gas injection molding of fiber reinforced resin and a molded article.

DISCLOSURE OF INVENTION

Technical Problem

This invention was developed to solve the problems of the prior art, and it is an object of the invention to provide a foam-molding mold comprising a cavity for accommodating mixed resin for foaming, and having channels formed therein for guiding gas to the cavity.

It is another object of the invention to provide a physical foaming process for preparing a foamed body using the foam-molding mold.

It is still another object of the invention to provide a foamed body prepared by the physical foaming process.

Technical Solution

As technical means to achieve the aforementioned technical problems, according to one aspect of the invention,
there is provided a foam-molding mold(1) comprising: an upper mold(10) having a gas inlet(15); and a lower mold(20) comprising a cavity(30) formed inside for accommodating mixed resin for foaming, wherein the lower mold(20) has channels(40, 50) formed therein for guiding gas fed from the gas inlet(15) to the cavity(30).

The upper mold(10) and lower mold(20) may be detachable from each other.

The cavity(30) may be formed at the center of the lower mold(20), and the channels(40, 50) may be formed on the outer surface of the cavity(30).

The channels(40, 50) may comprise a first channel(40) for primarily accommodating gas fed from the gas inlet(15); and a second channel(50) for guiding gas fed from the first channel(40) to the cavity(30).

The second channel(50) may be formed in a horizontal direction on the outer surface of the cavity(30), and the first channel(40) and cavity(30) may be spaced apart from each other by the second channel(50).

The mixed resin for foaming may be in the form of solid.

The mixed resin for foaming may be in the form of solid of a sheet or pellet.

The mixed resin for foaming may be accommodated such that it may occupy 50% to 110% of the volume of the cavity(30).

The gas may comprise gases selected from the group consisting of nitrogen, carbon dioxide, supercritical carbon dioxide, argon, helium and combinations thereof.

According to another aspect of the invention,
there is provided a physical foaming process for preparing a foamed body using the foam-molding mold(1), comprising steps of: injecting mixed resin for foaming in the cavity(30); closing the cavity(30) using the upper mold(10); injecting gas in the cavity(30); maintaining the inside of the cavity(30) at a constant pressure to dissolve injected gas in the mixed resin for foaming; and opening the cavity(30) to release pressure, thereby conducting foaming.

The closing of the cavity(30) may be conducted with a pressure of 100 to 200 kgf/cm$^2$.

The gas injected in the cavity(30) may be pressurized to a pressure of 5 to 20 MPa and injected.

The step of dissolving the gas in the mixed resin for foaming may be conducted under a pressure of 5 to 20 MPa.

The step of dissolving the gas in the mixed resin for foaming may be conducted for 1 to 100 minutes.

The step of conducting foaming may demold a foamed body foam-molded in the form of a chamber, simultaneously with conducting foaming.

A temperature inside the cavity(30) may be 50 to 200° C.

According to yet another aspect of the invention,
there is provided a foamed body prepared by the physical foaming process.

Advantageous Effects

As explained, since the foam-molding mold according to the present disclosure has channels formed therein for guiding gas to a cavity accommodating mixed resin for foaming, blocking of a gas inlet may be prevented, and gas injection may be facilitated, and simultaneously, washing of the mold may be easy, thus reducing a processing time.

Further, the physical foaming process using the foam-molding mold does not use a chemical blowing agent, and thus, is environment-friendly, and it reduces a processing time, thus preparing a foamed body with improved properties at a low cost.

Moreover, it is easy to change processing conditions, and thus, the cell structure of a foamed body may be controlled, thereby controlling mechanical properties including STS (split tear strength) and repulsion elasticity, and the like.

BRIEF DESCRIPTION OF DRAWINGS

FIG. 1 is a schematic drawing showing a foam-molding mold according to one embodiment of the invention.

FIG. 2 is a schematic drawing showing a foam-molding mold according to one comparative example of the invention.

FIG. 3 is a schematic drawing showing a physical foaming process according to one embodiment of the invention.

FIG. 4 is a schematic diagram showing a physical foaming process using a foam-molding mold according to one embodiment.

FIGS. 5a and 5b are respectively a photograph showing a foam-molding mold according to one example of the invention.

FIG. 6 is a photograph showing a foamed body prepared according to one example of the invention.

FIG. 7 is a photograph showing a foamed body prepared according to one comparative example of the invention.

BEST MODE

Hereinafter, examples of the invention will be explained in detail such that a person having ordinary knowledge in the art can easily practice it. However, this invention can be embodied in various forms, and is not limited to the examples described herein.

Example 1. Preparation of Foamed Body

A foamed body was prepared using a foam-molding mold as shown in FIG. 1. Specifically, to 95 g (95% of the total volume of the cavity) of mixed resin for foaming in the form of a sheet, a nucleating agent (CaCO$_3$, 4 g) and a crosslinking agent (DCP, 0.48 g) were added, and then, it was injected in a pressure cavity, the cavity was closed with a pressure of 150 kgf/cm$^2$, and then, nitrogen of 15 Mpa was charged in the cavity. And then, the gas was saturated in the resin for 30 minutes under a cavity temperature of 150° C., and then, the cavity was instantaneously opened to prepare a foamed body.

Example 2. Preparation of Foamed Body

A foamed body was prepared by the same method as Example 1, except that 105 g (105% of the total volume of the cavity) of mixed resin for foaming was injected.

Comparative Example. Preparation of Foamed Body

A foamed body was prepared by the same method as Example 1, except that a foamed body was prepared using a foam-molding mold as shown in FIG. 2.

Experimental Example. Comparison of Appearances and Properties of Foamed Bodies

In order to compare the appearances of the foamed bodies prepared in Examples and Comparative Examples, they were respectively photographed and shown in FIG. 6 (Examples) and FIG. 7 (Comparative Example). Wherein, the photograph shown on the left side of FIG. 6 was the foamed body prepared by the method of Example 1, and the photograph shown on the right side of FIG. 6 was the foamed body prepared by the method of Example 2.

Referring to FIGS. 6 and 7, it can be confirmed that the foamed bodies prepared by the Examples of the invention had smooth surfaces, while the foamed body prepared according to the Comparative Example had protrusions formed on the surface. That is, it can be confirmed that in the foamed body prepared according to the Comparative Example, protrusions are generated because a gas inlet is positioned such that it may directly correspond to the cavity.

Meanwhile, it was confirmed that when preparing foamed bodies according to the Examples, gas injection was smoothly conducted, and thus, the prepared foamed body showed low specific gravity (0.22 g/cc), while when preparing a foamed body according to the Comparative Example, gas injection was not smooth, and thus, the prepared foamed body showed high specific gravity (0.37 g/cc).

Embodiments of the Invention

Hereinafter, the invention will be explained in more detail. However, this invention may be embodied in various forms, and is not limited by examples described herein, but is defined only by the claims described below.

Moreover, the terms used herein are only to explain specific embodiments, and are not intended to limit the invention. A singular expression includes a plural expression thereof, unless it is expressly stated or obvious from the context that such is not intended. Throughout the specification, 'comprising' any constructional element does not mean that other constructional elements are excluded, but means that other constructional elements may be further included, unless otherwise stated.

According to the first aspect of the invention, there is provided a foam-molding mold(1) comprising: an upper mold(10) having a gas inlet(!5); and a lower mold(20) comprising a cavity(30) formed inside for accommodating mixed resin for foaming, wherein the lower mold(20) has channels(40, 50) formed therein for guiding gas fed from the gas inlet(15) to the cavity(30).

Hereinafter, the foam-molding mold(1) according to the first aspect of the invention will be explained in detail with reference to FIG. 1 and FIG. 2. Wherein, FIG. 1 is a schematic drawing showing a foam-molding mold(1) according to one embodiment of the invention, and FIG. 2 is a schematic drawing showing a foam-molding mold(100) according to one comparative example of the invention.

According to one embodiment of the invention, the foam-molding mold(1) may be used for the preparation of a high functional foamed body by physical blowing agent based foaming, which is used for the manufacture of the insole, midsole, outsole, and the like of shoes. Namely, in order to prepare the foamed body, the present disclosure adopts a physical foaming process, and among the physical foaming process, a 1-step pressure release foaming process in which foaming and molding are simultaneously progressed is adopted. Thus, the foam-molding mold(1) may be one used for a pressure release foaming process, and by preparing a foamed body therethrough, with a total processing time similar to that of the existing chemical foaming process (40~60 minutes), the processing conditions may be easily changed, thereby easily controlling the properties of a foamed body. Meanwhile, for the unit of a pressure, both kgf/cm$^2$ and MPa will be used herein. Wherein, 1 MPa corresponds to about 10.197162 kgf/cm$^2$.

According to one embodiment of the invention, the upper mold(10) may have a gas inlet(15) installed therein. Namely, as shown in FIG. 1, the upper mold(10) may have a gas inlet(15) for injecting gas from the upper side to the lower side penetrating through the inside, and gas fed through the gas inlet(15) may be fed to the cavity(30) of the lower mold(20). Further, through the gas inlet(15), gas may be preferably injected in total two routes corresponding to both sides of the upper mold(10), as shown in FIG. 1, and it may be injected in total 4 routes corresponding to each side. It is closely related to the channels(40, 50) formed in the lower mold(20), which will be specifically explained below.

According to one embodiment of the invention, the lower mold(20) may have a cavity(30) formed therein, for accommodating mixed resin for foaming. The cavity(30) is also referred to as a Mold, and it may mean an empty space formed when assembling a formwork and the like, or a device having such an empty space formed therein. In the present disclosure, the empty space itself will be referred to as a cavity(30), and as shown in FIG. 1, on the basis of the upper side of the lower mold(20), some parts may be depressed to the lower side to form a step difference, wherein the cavity(30) may mean the depressed part.

According to one embodiment of the invention, the upper mold(10) and lower mold(20) may be detachable from each other. That is, in a separated state, mixed resin for foaming may be injected in the cavity(30) of the lower mold(2), and they may be compressed and closed, and then, gas may be injected and dissolved in the mixed resin for foaming, and it may be separated again to release pressure, thereby conducting foaming. Wherein, although the shapes of the upper mold(10) and lower mold(2) are not significantly limited, they may be designed such that, when compressed, the inside may be completely closed and disconnected from the outside.

According to one embodiment of the invention, the cavity(30) may be formed at the center of the lower mold(20), and the channels(40, 50) may be formed on the outer surface of the cavity(30). Specifically, referring to FIG. 1, the shape of the cavity(30) is not significantly limited, but it may have to be formed at the center of the lower mold(20). Further, the channels(40, 50) may be formed on the upper side of the lower mold(20), and they may be formed between the outer surface of the cavity(30) and the end stage of the lower mold(20). Thus, gas fed through the gas inlet(15) of the upper mold(10) may be preferentially fed to the channels(40, 50), and it may move along the channels(40, 50) and fed to the cavity(30).

According to one embodiment of the invention, the channels(40, 50) may comprise a first channel(40) for primarily accommodating gas fed from the gas inlet(15); and a second channel(50) for guiding gas fed to the first channel(40) to the cavity(30). Specifically explaining with reference to FIG. 1, the first channel(40) may be formed between the outer surface of the cavity(30) and the end stage of the lower mold(20), and may be formed while being spaced apart from the outer surface and the end stage at a regular interval. Meanwhile, the first channel(40) may primarily accommodate gas fed from the gas inlet(15), and for this purpose, the gas inlet(15) may be installed such that it may correspond to the position of the first channel(40). Meanwhile, as explained above, through the gas inlet(15), gas may be preferably injected in total 2 routes corresponding to both sides of the upper mold(10), or may be injected in total 4 routes corresponding to each side, and thereby, gas may be uniformly injected in the first channel(40), and finally, the gas may be uniformly injected in the total space of the cavity(30).

According to one embodiment of the invention, the second channels(50) may be formed in a horizontal direction on the outer surface of the cavity(30), and the first channel(40) and the cavity(30) may be spaced apart from each other by the second channel(50). That is, as shown in FIG. 1, the second channels(50) may have a constant width and be formed in a horizontal direction on the outer surface of the cavity(30), and may be respectively formed omnidirectionally with the cavity(30) as the center. Meanwhile, FIGS. 5a and 5b are practical photographs showing the foam-molding mold(1) according to one example of the invention, and referring to the same, one second channel(50) or two or more second channels(50) may be formed on each side with the cavity(30) as the center. Further, since the first channel (40) and the cavity(3) are formed while being spaced apart from each other by the second channel(50), a distance between the gas inlet(15) and the cavity(30) are spaced apart, and thus, blocking of the gas inlet(15) due to the mixed resin for foaming accommodated in the cavity(30) may be prevented, and gas injection may become smooth and washing of the mold(1) itself may become easy, thus reducing a processing time.

According to one embodiment of the invention, FIG. 2 shows a foam-molding mold(100) according to one comparative example of the invention, wherein the foam-molding mold(100) comprises only the upper mold(110) having a gas inlet(120) installed at the center and the lower mold(130) having a cavity(150) formed therein for accommodating mixed resin for foaming, and does not comprise additional channels. That is, in case the foam-molding mold(100) according to FIG. 2 is used, since the gas inlet(120) is formed such that it may directly correspond to the cavity(150) and thus a distance between the gas inlet(120) and the cavity(150) is close, blocking of the gas inlet(120) may be caused due to back flow of the mixed resin for foaming, and thereby, gas injection may not be smoothly progressed, and there may be a difficulty in washing the mold(1) itself. Further, since gas is fed directly to the mixed resin for foaming, protrusion may be generated on the upper surface of the prepared foamed body, thus causing deterioration of quality.

According to one embodiment of the invention, the mixed resin for foaming may be resin comprising ethylene-vinyl acetate copolymer (EVA) and olefin-based elastomer, but is not limited thereto. The ethylene-vinyl acetate copolymer (EVA) is a polymer obtained by copolymerization of ethylene and vinyl acetate, and the olefin-based elastomer may refer to a polymer obtained by copolymerization of ethylene and alpha olefin. Meanwhile, the mixed resin for foaming may be in the form of solid, and preferably in the form of solid of a sheet or pellet. Further, the mixed resin for foaming may be accommodated such that it may occupy 50% to 110% of the volume of the cavity(30). That is, the foam-molding mold(1) additionally has the first channel(40) and second channel(50) along with a cavity(30), the mixed resin for foaming may be accommodated exceeding 100% of the volume of the cavity(30).

According to one embodiment of the invention, the gas may comprise gases selected from the group consisting of nitrogen, carbon dioxide, supercritical carbon dioxide, argon, helium and combinations thereof.

According to the second aspect of the invention,
there is provided a physical foaming process for preparing a foamed body using the foam-molding mold(1) according to the first aspect, comprising steps of: injecting mixed resin for foaming in the cavity(30); closing the cavity(30) using the upper mold(10); injecting gas in the cavity(30); maintaining the inside of the cavity(30) at a constant pressure to dissolve injected gas in the mixed resin for foaming; and opening the cavity(30) to release pressure, thereby conducting foaming.

According to the third aspect of the invention,
there is provided a foamed body prepared by the physical foaming process of the second aspect of the invention.

Although detailed descriptions of the parts overlapping with the first aspect of the invention have been omitted, the same as explained for the first aspect of the invention apply to the second aspect and third aspect of the invention.

Hereinafter, the physical foaming process using the foam-molding mold(1) and foamed body prepared thereby according to the second aspect and third aspect of the invention will be explained in detail according to steps, referring to FIG. 3 and FIG. 4. Wherein, FIG. 3 is a schematic drawing showing a physical foaming process, and FIG. 4 is a schematic drawing showing a physical foaming process using the foam-molding mold(1).

First, according to one embodiment of the invention, the physical foaming process using the foam-molding mold(1) may comprise a step of injecting mixed resin for foaming in a cavity(30).

According to one embodiment of the invention, the mixed resin for foaming may be resin comprising ethylene-vinyl acetate copolymer (EVA) and olefin-based elastomer, but is not limited thereto. The ethylene-vinyl acetate copolymer (EVA) is a polymer obtained by copolymerization of ethylene and vinyl acetate, and the olefin-based elastomer may refer to a polymer obtained by copolymerization of ethylene and alpha olefin. Meanwhile, the mixed resin for foaming may be in the form of solid, and preferably in the form of solid of a sheet or pellets. Further, the mixed resin for foaming may be accommodated such that it may occupy 50% to 110% of the volume of the cavity(30).

Next, according to one embodiment of the invention, the physical foaming process using the foam-molding mold(1) may comprise a step of closing the cavity(30) using the upper mold(10).

According to one embodiment of the invention, closing of the cavity(30) may be conducted with a pressure of 100 to 200 kgf/cm$^2$.

Next, according to one embodiment of the invention, the physical foaming process using the foam-molding mold(1) may comprise a step of injecting gas in the cavity(30).

According to one embodiment of the invention, the gas injected in the cavity(30) may be pressurized to a pressure of 5 to 20 MPa and injected. In case it is pressurized to a pressure of 5 MPa or less, the efficiency of penetration of injected gas into the mixed resin for foaming may decrease, and in case it is pressurized to a pressure of 20 MPa or more, device load may be increase. Wherein, the injected gas may comprise gases selected from the group consisting of nitrogen, carbon dioxide, supercritical carbon dioxide, argon, helium, and combinations thereof.

Next, according to one embodiment of the invention, the physical foaming process using the foam-molding mold(1) may comprise a step of maintaining the inside of the cavity(30) at a constant pressure to dissolve injected gas in the mixed resin for foaming.

According to one embodiment of the invention, the step of dissolving the gas in the mixed resin for foaming may be conducted under a pressure of 5 to 20 MPa, and it may be conducted for 1 to 100 minutes. Wherein, the total required time of the physical foaming process depends on this step, and preferably, it may be maintained for 30 to 70 minutes such that a processing time similar to that of the existing chemical foaming may be taken. Compared to the existing physical foaming process wherein thermodynamic instability is induced by heating (heating method), according to the heating method, mixed resin for foaming is taken out and heated about 48 hours after saturating gas, thus slowly foaming, while according to the physical foaming process of the invention, time efficiency is remarkably improved.

Next, according to one embodiment of the invention, the physical foaming process using the foam-molding mold(1) may comprise a step of opening the cavity(30) to release pressure inside, thereby conducting foaming.

According to one embodiment of the invention, the step of conducting foaming may comprise opening the cavity(30) to release pressure inside, thereby conducting foaming. That is, if the cavity(30) is instantaneously opened, pressurized gas may be discharged, and an atmospheric pressure may apply to the cavity(30), and thus, thermodynamic instability may be induced, and vaporization of the gas immersed in the mixed resin for foaming may be triggered and the mixed resin for foaming may be expanded and foamed. Further, simultaneously with foaming, a foamed body foam-molded in the form of a chamber may be demolded. As such, in case foaming and molding are simultaneously progressed in 1-step, it may be preferable because molding through post processing may not be required. Wherein, the shape of the foamed body may be formed such that it may correspond to the shape of the inner space of the cavity(30).

According to one embodiment of the invention, the temperature of the cavity may be maintained at 50 to 200° C., preferably at a temperature of 90 to 180° C.

According to one embodiment of the invention, during the foaming process, the cell size of the foamed body may be controlled to 5 μm to 1 mm. Further, the cell size may be controlled such that the maximum cell size may be controlled to 40 μm, and the like.

Although the invention has been explained in detail by preferable embodiments referring to drawings, the scope of technical idea of the invention is not limited to such drawings and embodiments. Thus, various modifications or embodiments in an equivalent range may exist within the range of technical idea of the invention. Therefore, the scope of the right of the technical idea according to the invention should be interpreted by the claims, and it should be interpreted that technical ideas within a range equal or equivalent thereto belong to the scope of the right of the invention.

DESCRIPTION OF REFERENCE NUMERALS

1, 100: foam-molding mold
10, 110: upper mold
15, 120: gas inlet
20, 130: lower mold
30, 150: cavity
40: first channel
50: second channel

INDUSTRIAL APPLICABILITY

As explained, since the foam-molding mold according to the present disclosure has channels formed therein for guiding gas to a cavity accommodating mixed resin for foaming, blocking of a gas inlet may be prevented, and gas injection may be facilitated, and simultaneously, washing of the mold may be easy, thus reducing a processing time.

Further, the physical foaming process using the foam-molding mold does not use a chemical blowing agent, and thus, is environment-friendly, and it reduces a processing time, thus preparing a foamed body with improved properties at a low cost.

Moreover, it is easy to change processing conditions, and thus, the cell structure of the foamed body may be controlled, thereby controlling mechanical properties including STS (split tear strength) and repulsion elasticity, and the like.

The invention claimed is:

1. A foam-molding mold comprising
an upper mold having a gas inlet; and
a lower mold comprising a cavity formed inside, for accommodating mixed resin for foaming,
wherein the lower mold has channels formed therein, for guiding gas fed from the gas inlet to the cavity,
wherein the channels comprise a first channel for primarily accommodating gas fed from the gas inlet and a second channel for guiding gas fed from the first channel to the cavity,
wherein the second channel is formed in a horizontal direction on an outer surface of the cavity, and the first channel and cavity are spaced apart from each other by the second channel, and
wherein the gas inlet is installed to correspond to a position of the first channel.

2. The foam-molding mold according to claim 1, wherein the upper mold and lower mold are detachable from each other.

3. The foam-molding mold according to claim 1, wherein the cavity is formed at a center of the lower mold, and the channels are formed on the outer surface of the cavity.

4. The foam-molding mold according to claim 1, wherein the mixed resin for foaming is in a form of solid.

5. The foam-molding mold according to claim 4, wherein the mixed resin for foaming is in the form of solid of a sheet or pellet.

6. The foam-molding mold according to claim 1, wherein the mixed resin for foaming is accommodated such that it occupies 50% to 110% of a volume of the cavity.

7. The foam-molding mold according to claim 1, wherein the gas comprises gases selected from the group consisting of nitrogen, carbon dioxide, supercritical carbon dioxide, argon, helium and combinations thereof.

* * * * *